(12) United States Patent
Ueda et al.

(10) Patent No.: US 7,337,525 B2
(45) Date of Patent: Mar. 4, 2008

(54) ELECTRIC ROTATING MACHINE AND STATOR FOR THE SAME

(75) Inventors: Toshiaki Ueda, Naka (JP); Yoshimi Mori, Mito (JP); Masaki Okamura, Hitachinaka (JP); Sakae Ishida, Hitachinaka (JP); Toshinori Watanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/734,131

(22) Filed: Apr. 11, 2007

(65) Prior Publication Data

US 2007/0180682 A1 Aug. 9, 2007

Related U.S. Application Data

(62) Division of application No. 10/824,543, filed on Apr. 15, 2004, now abandoned.

(30) Foreign Application Priority Data

Apr. 16, 2003 (JP) ............................. 2003-110978

(51) Int. Cl.
  *H02K 15/085* (2006.01)
  *H02K 15/06* (2006.01)
  *H02K 15/04* (2006.01)
(52) U.S. Cl. ..................................................... 29/596
(58) Field of Classification Search .............. 29/596; 310/180, 184
  See application file for complete search history.

(56) References Cited

U.S. PATENT DOCUMENTS

| 2,873,514 | A |  | 2/1959 | Mills |  |
|---|---|---|---|---|---|
| 3,750,273 | A |  | 8/1973 | Beddows |  |
| 4,427,910 | A |  | 1/1984 | Richter et al. |  |
| 5,998,903 | A |  | 12/1999 | Umeda et al. |  |
| 6,425,175 | B1 | * | 7/2002 | Sawada et al. | 29/596 |
| 6,865,796 | B1 | * | 3/2005 | Oohashi et al. | 29/596 |
| 6,901,649 | B2 | * | 6/2005 | Imori et al. | 29/596 |

(Continued)

FOREIGN PATENT DOCUMENTS

DE 961 008 C 3/1957

(Continued)

OTHER PUBLICATIONS

European Search Report dated Jul. 13, 2004, issued in corresponding EP application EP 040009112.

*Primary Examiner*—Burton Mullins
(74) *Attorney, Agent, or Firm*—Crowell & Moring LLP

(57) ABSTRACT

An electric rotating machine has a rotor having N and S poles and includes a stator with an annular stator core and slots. Multiple-phase stator windings are embedded in the slots, and are formed by winding continuous wires such that straight parts of the stator windings pressed in a flat shape are wound in rings around a grooved cylindrical member. The cylindrical member is inserted into a bore defined by the annular stator core so that the grooves of the cylindrical member are arranged opposite to the slots. The sets of the windings are folded back alternately outside the slots of the stator core and are wound so the sets of the windings are embedded alternately in the direction of the depth of the slots. Leading and trailing ends of the continuous wires are superposed after being wound at least one turn around the circumferentially arranged slots of the stator.

4 Claims, 6 Drawing Sheets

U.S. PATENT DOCUMENTS

| | | | |
|---|---|---|---|
| 7,225,526 B2 * | 6/2007 | Tokizawa | 29/596 |
| 2001/0019234 A1 | 9/2001 | Murakami et al. | |
| 2002/0036439 A1 | 3/2002 | Ooiwa | |

FOREIGN PATENT DOCUMENTS

| | | |
|---|---|---|
| EP | 1286045 A2 | 2/2003 |
| GB | 639069 A | 6/1950 |
| JP | 11-155270 | 6/1999 |
| JP | 2001-245446 | 9/2001 |

* cited by examiner

ELECTRIC ROTATING MACHINE AND STATOR FOR THE SAME

RELATED APPLICATION

This application is a division of U.S. application Ser. No. 10/824,543 now abandoned.

CLAIM OF PRIORITY

The present application claims priority from Japanese application serial No. 2003-110978, filed on Apr. 16, 2003, the content of which is hereby incorporated by reference into this application.

1. Technical Field of the Invention

The present invention relates to an electric rotating machine and, more particularly, to a stator included in the electric rotating machine, such as a generator for vehicles.

2. Description of the Prior Art

In a stator of a conventional automotive alternator disclosed in, for example, Jpn. Pat. No. 2,927,288, stator windings of short length conductor segments formed in substantially U-shape are inserted into slots, wherein the inserted conductor segments are joined at ends of the windings.

Whereas the conventional stator employs the conductor segments, a stator disclosed in JP-A No. 2001-245446 is formed by inserting straight windings in slots formed in a straight stator core in the direction of the depth of the slots. Then, the straight stator core is shaped by bending into a cylindrical shape at a post processing, thereby to increase the space factor of the conductor in the slots and to simplify the method of fabricating the stator.

Although the space factor of the windings embedded in the slots increases remarkably, the stator core cannot be formed in a satisfactory roundness by rolling the flat stator core after embedding the windings in the slots, and gaps are formed in the joint of the opposite sides of the flat stator core. Consequently, the stator core causes problems including the enhancement of magnetic noise and the reduction of output. Defective insulation of the windings embedded in the slots occurs due to damaging insulating paper and the insulating coatings of the wires of the windings embedded in the slots by welding heat applied thereto in welding the joint in the cylindrical stator core.

In fabricating the known automotive alternator mentioned in Jpn. Pat. No. 2927288, the plurality of short conductor segments need to be fitted in the slots of the stator core and the ends of the conductor segments need to be bonded by welding or the like. Thus, the automotive alternator requires troublesome assembling work and the insulation of the conductors is liable to be damaged. The joined parts are often melted and short-circuited during welding, and the automotive alternator is difficult to mass-produce.

Ends of the coils are joined in a plurality of joints, the joints are liable to be short-circuited and thereby the coils are often short-circuited. Since the plurality of conductor segments are fitted in the slots of the stator core, and the ends of the conductor segments are joined together by welding or the like, troublesome work is needed for positioning the plurality of ends.

If the insulating films coating the joining ends of the conductor segments are removed incompletely, organic gases are produced during welding and deteriorate the quality of the joints. Thus, additional work is needed for removing the insulating films.

When ends of the conductor segments are melted for welding, the joints are often short-circuited, reducing the quality of mass-produced stators.

The stator disclosed in JP-A No. 2001-245446 is formed by embedding windings in the slots formed in the flat stator core, rolling the flat stator core in a cylindrical shape and joining together the opposite sides of the rolled stator core in a butt joint. Thus, the stator core causes problems including the enhancement of magnetic noise, the reduction of output and the defective insulation of the windings.

Although the space factor of the windings increases remarkably, the stator core cannot be formed in a satisfactory roundness by rolling the flat stator core after embedment of the windings in the slots, and gaps are formed in the joint of the opposite sides of the flat stator core. Consequently, the stator core causes problems including the enhancement of magnetic noise and the reduction of output. Defective insulation of the windings embedded in the slots occurs due to damaging insulating paper and the insulating coatings of the wires of the windings embedded in the slots by welding heat applied thereto in welding the joint in the cylindrical stator core.

SUMMARY OF THE INVENTION

The present invention is intended to solve those problems and it is therefore an object of the present invention to provide a stator for an electric rotating machine, capable of being efficiently assembled, and provided with windings less subject to short circuit and mounted on a stator core in a satisfactorily insulated state.

DETAILED DESCRIPTION OF THE INVENTION

To solve the problems the present invention forms stator windings for a stator included in an electric rotating machine by winding a plurality of continuous wires around a spool, forms flat straight parts of the stator windings to be embedded in the slots of the stator core by press-forming straight parts of the stator windings, winds a stator winding set in an annular shape around a cylindrical member provided with grooves the number of which is equal to that of the slots of the stator core, inserts the cylindrical member in a bore defined by the annular stator core, adjusts the position of the cylindrical member in the bore of the annular stator core so that the grooves of the cylindrical member are positioned opposite to the slots of the stator core, respectively, expands and inserts the straight parts of the windings wound around the grooves in the slots of the stator core in an expanded manner, folds back the winding set alternately outside the slots of the stator core to form windings embedded alternately in the direction of the depth of the slots every predetermined number of slots, and winds leading and trailing ends of the plurality of continuous wires at least one turn around the circumferentially arranged slots of the stator core so that the leading and the trailing ends of the plurality continuous wires are superposed.

In the stator of the electric rotating machine according to the present invention, the stator windings are formed in at least two winding sets by winding a plurality of continuous wires, and the stator windings are arranged at intervals of the predetermined number of slots so that the trailing ends of the winding sets may not be superposed with respect to a circumferential direction of the stator core.

In the stator of the electric rotating machine according to the present invention, the slots of the stator core are open slots.

In the stator of the electric rotating machine according to the present invention, the stator windings embedded in the slots of the stator core are fixed in place by driving magnetic wedges in the slots.

DETAILED DESCRIPTION OF THE PREFERRED EMBODIMENTS

Rotors for electric rotating machines in preferred embodiments according to the present invention will be described with reference to the accompanying drawings.

First Embodiment

Figure 1:
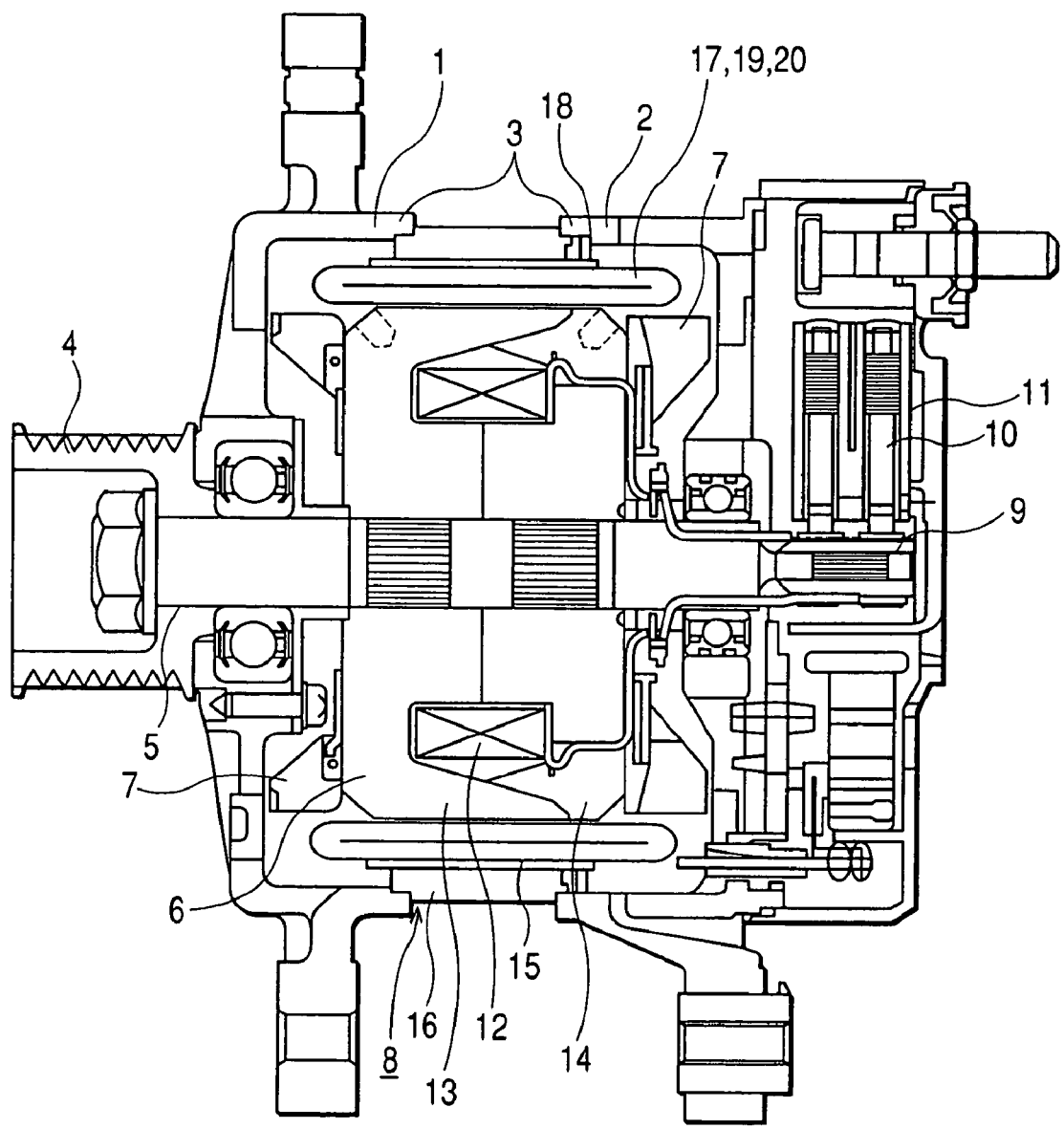
FIG. 1 is a sectional view of an automotive alternator in a first embodiment according to the present invention.
Figure 2:
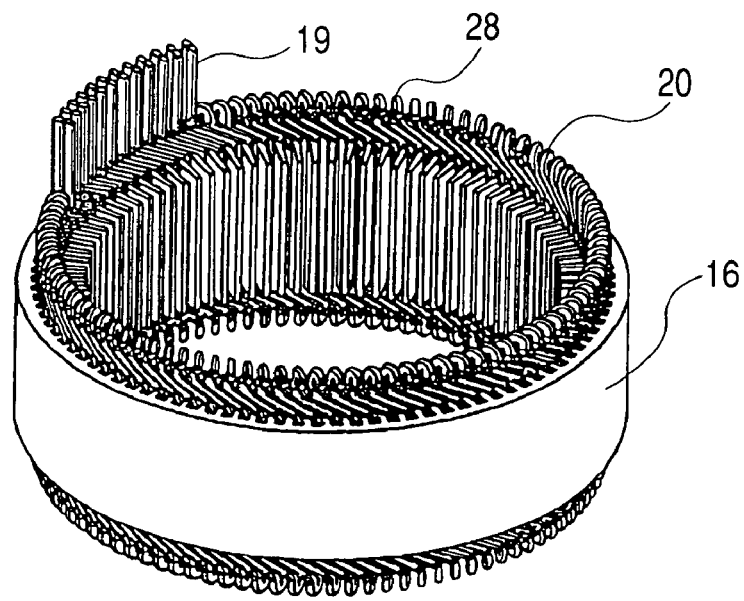
FIG. 2 is a perspective view of a stator included in the automotive alternator shown in FIG. 1.
Figure 3:
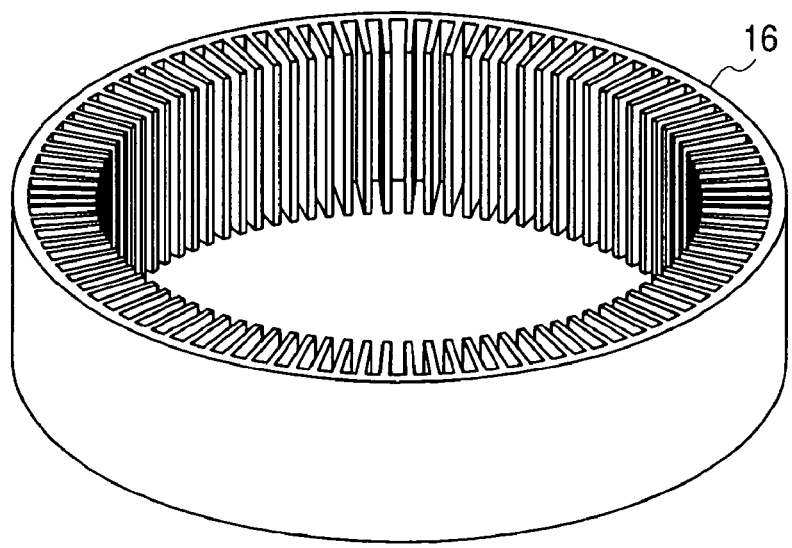
FIG. 3 is a perspective view of a stator core shown in FIG. 1.

FIG. 1 is a sectional view of an automotive alternator in a first embodiment according to the present invention, FIG. 2 is a perspective view of a stator included in the automotive alternator shown in FIG. 1, and FIG. 3 is a perspective view of a stator core shown in FIG. 1.

The alternator includes a case 3 having an aluminum front bracket 1 and an aluminum rear bracket 2, a shaft 5 extended in the case 3 and having one end part on which a pulley 4 is fixedly mounted, a Randall type rotor 6 fixed to the shaft 5, fans 7 attached to the opposite end surfaces of the rotor 6, a stator 8 fixed to the inside surface of the case 3, a slip ring fixed to the other end part of the shaft 5 to supply currents to the rotor 6, a pair of brushes 10 in sliding contact with the slip ring 9, a brush holder 11 internally holding the brushes 10, a rectifier, not shown, electrically connected to the stator 8 to convert an alternating current generated in the stator 8 into a direct current, and a voltage regulator, not shown, for regulating ac voltage generated in the stator 8.

The rotor 6 includes rotor coils 12 through which a current flows to generate magnetic flux, and a pair of pole cores 13 and 14 covering the rotor coils 12. The pair of pole cores 13 and 14 is formed of iron and is provided with claw-shaped magnetic pole pieces circumferentially arranged at equal angular intervals on their circumferences. The pole cores 13 and 14 are disposed opposite to each other and the shaft 5 is pressed in the bores of the pole cores 13 and 14 so that the magnetic cores are engaged.

The stator 8 has a laminated stator core 16 provided in its inner circumference with axial slots 15 arranged at predetermined angular intervals, multiple-phase stator windings 17 held on the stator core 16, and insulating members 18, such as insulating paper sheets, inserted in the slots 15 to insulate the multiple-phase windings 17 electrically from the stator core 16. Each of the multiple-phase windings 17 is formed in a wave winding in the slots 15 by folding back a single conductor 19 at the axial ends of the stator core 16 so as to form an inner and an outer layer alternately with respect to the depth of the slot 15 every predetermined number of slots 15. In this embodiment, the stator core 16 is provided with ninety-six slots 15 arranged at equal angular intervals to hold one set of multiple stator windings 20 (three-phase stator windings) for the sixteen magnetic poles of the rotor 6. The conductor 19 is a long, insulated copper wire having a rectangular cross section. The stator 8 thus constructed will be described. FIGS. 4 to 11 are views of assistance in explaining a winding set fabricating procedure for forming a winding set forming the stator windings.

Figure 4:
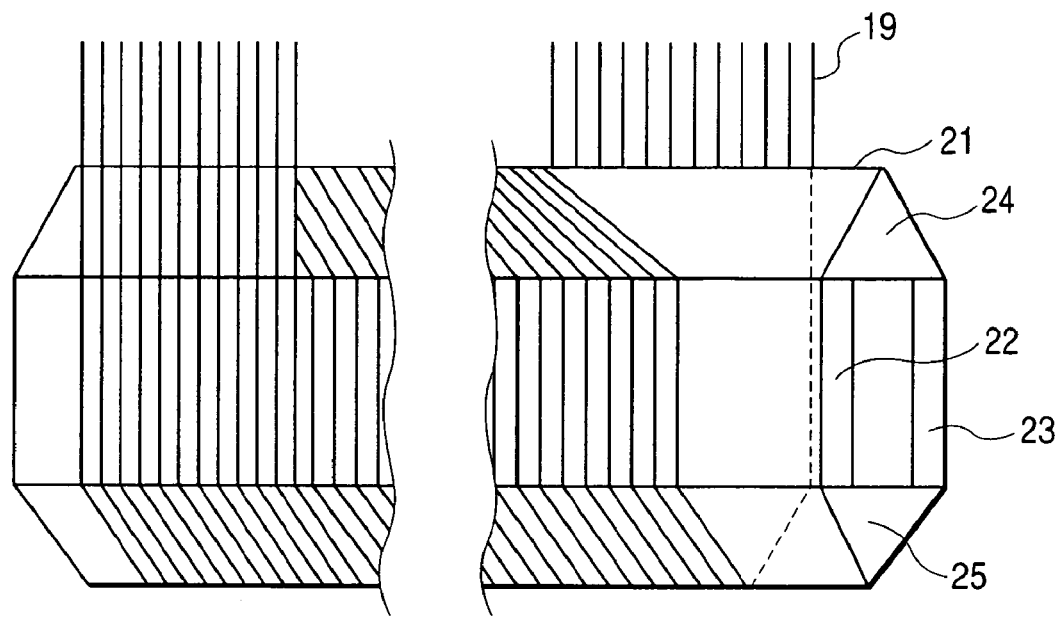
FIG. 4 is a view of assistance in explaining a procedure for forming windings.

Referring to FIG. 4, twelve long conductors 19 are wound parallel to each other on a spool 21. The spool 21 has four members, namely, a pair of winding members 22 and 23 corresponding to straight parts of the slots of the stator, and a pair of winding members 24 and 25 corresponding to the coil ends of the stator. The spool 21 has a shape resembling a hexagonal cylinder. Grooves for guiding the conductors 9 are formed in the surfaces of the winding members 22 and 23 at pitches equal to those of the stator slots. The depth of the grooves is less than half the diameter of the conductors 19.

Figure 5:
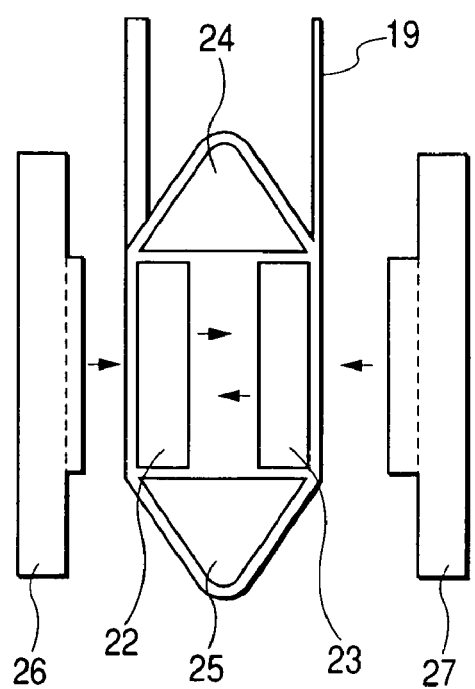
FIG. 5 is a view of assistance in explaining a procedure for forming a flat winding set.
Figure 6:
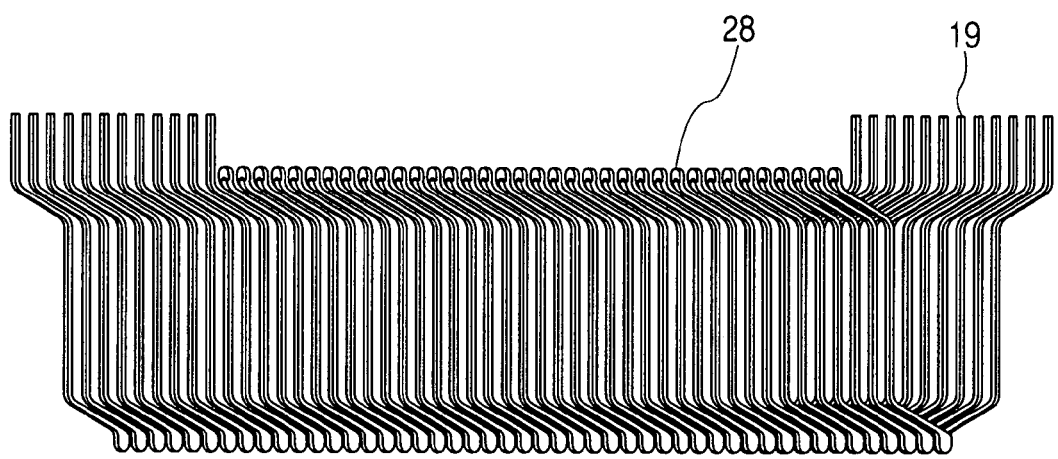
FIG. 6 is a plan view of a flat winding set.

Referring to FIG. 5, the spool 21 is held between forming members 26 and 27. Guide grooves similar to those of the members 22 and 23 are formed in part of the forming members 26 and 27. Then, the winding members 22 and 23 are shifted toward each other with the conductors 19 wound on the spool 21 partly received in the grooves of the forming members 26 and 27 to release the conductors 19 from the winding members 22 and 23, and the winding members 22 and 23 are extracted in the direction of the axis of the spool 21. Likewise, the winding members 24 and 25 are extracted from the wound conductor 19 in the direction of the axis of the spool 21. Then, the forming members 26 and 27 holding the conductors 19 in their grooves are moved toward each other to form a flat winding set 28 of the conductors 19 as shown in FIG. 6 by flattening the windings of the conductors 19.

Figure 7:
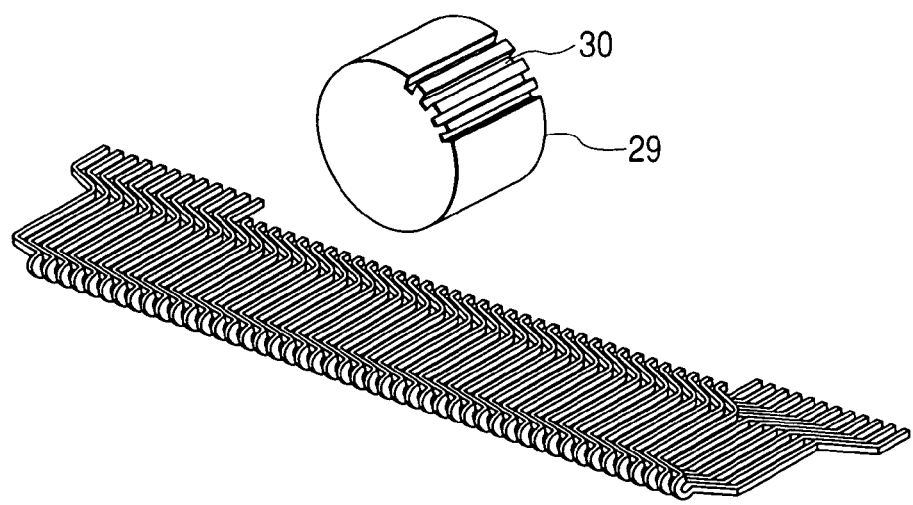
FIG. 7 is a view of assistance in explaining a procedure for rolling a flat winding set in an annular shape.

Then, as shown in FIG. 7, the winding set 28 with the conductors 19 received in the grooves of the forming member 27 is wound around an inserting jig 29 such that the conductors 19 are received in grooves 30 formed in the circumference of the inserting jig 29. The forming member 27 is formed of a flexible material, such as silicone rubber. The diameter of the inserting jig 29 is slightly smaller than the inside diameter of the stator core 16. The pitches of the grooves 30 of the inserting jig 29 are equal to those of the stator slots. In this embodiment, the depth of the grooves 30 is not less than twice the diameter of the conductor 19.

Figure 8:
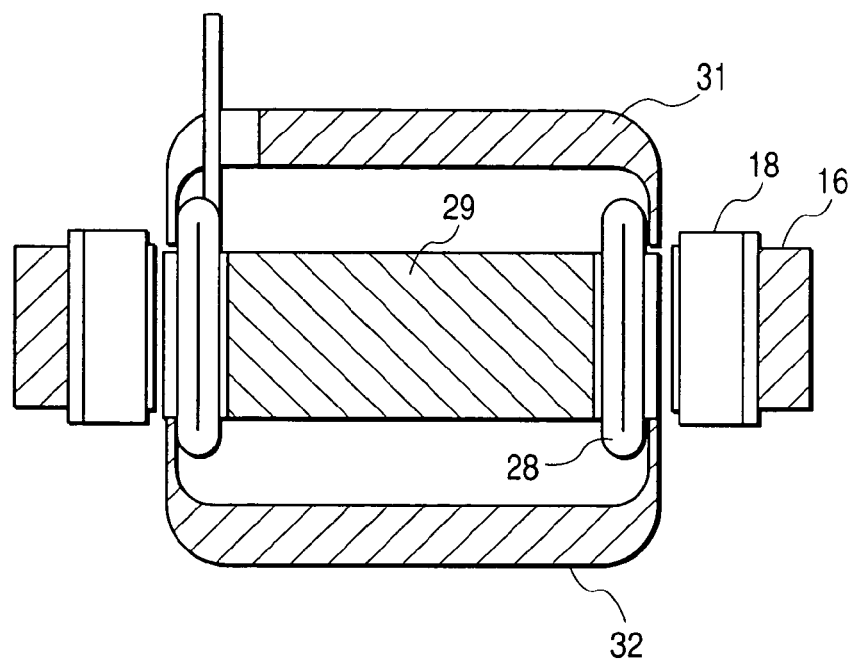
FIG. 8 is a sectional view of assistance in explaining a procedure for inserting an annular winding set in a stator core.

Referring to FIG. 8, cup-shaped retaining jigs 31 and 32 are put on the opposite coil end parts of the winding set 28 wound around the inserting jig 29. The retaining jig 31 is provided with a recess to provide a clearance for the end part of the winding set 28. The outside diameters of the retaining jigs 31 and 32 are equal to the diameter of the inserting jig 29. Then, the inserting jig 29, the winding set 28 and the retaining jigs 31 and 32 are united integrally in an assembly, and the assembly is inserted axially in a bore defined by the stator core 16. When the assembly is thus inserted in the stator core 16, the positional relation between the assembly and the stator core 16 is adjusted so that the grooves 30 of the inserting jig 29 correspond to the slots of the stator core 16, respectively. The insulating members 18 are fitted beforehand in the slots.

Figure 9:
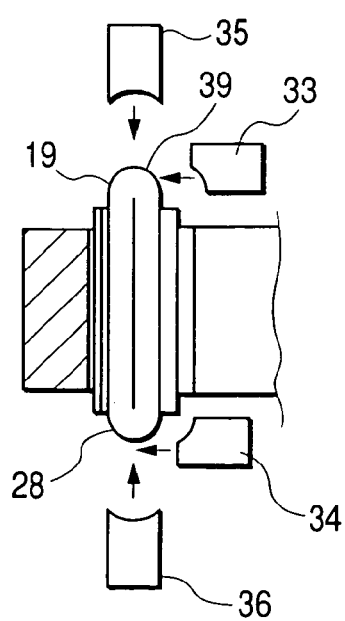
FIG. 9 is a view of assistance in explaining a procedure for inserting an annular winding set in a stator core.

Referring to FIG. 9, the retaining jigs 31 and 32 are removed, and the winding set 28 is expanded and pressed in the slots with expanding jigs 33 and 34 and, at the same time, the coil end parts are pressed axially with pressing jigs 35 and 36. Consequently, the pitches of parts, to be fitted in the slots, of the conductors 19 of the winding set 28 are increased to facilitate pressing the conductors 19 in the slots. The slots are open slots and hence the conductors 19 can be thus easily pressed in the slots.

Figure 10:
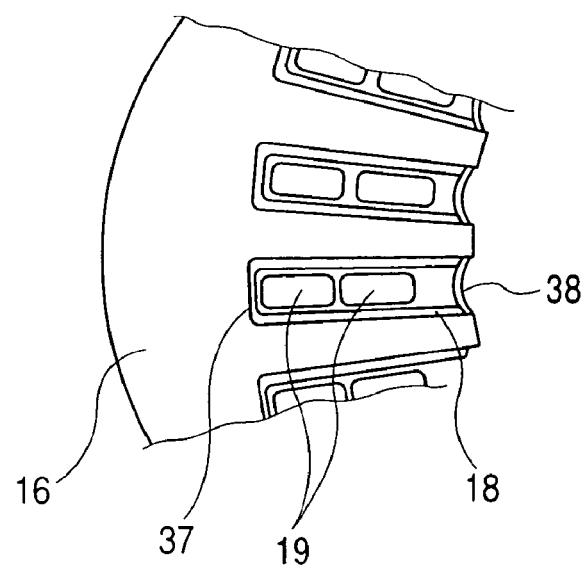
FIG. 10 is a sectional view of assistance in explaining the state of conductors in a slot.

Referring to FIG. 10, conductors 19 for two turns are fitted in each of the stator slots 37. A wedge 38 is fixedly driven in an inner end part of the slot 37 to prevent the conductors 19 from coming off radially inward from the slot 37. Desirably, the wedge 38 is a magnetic wedge formed of a magnetic material to reduce loss in a magnetic circuit attributable to open slots.

The expanding jigs 33 and 34, the pressing jigs 35 and 36, and the inserting jig 29 are removed, and the ends of the conductors 19 are connected to form multiple stator windings 20. An insulating resin is applied to the assembly of the stator core 16 and the winding set 28 to connect the conductors 19 together, and to fix the conductors 19 to and insulate the same from the stator core 16. Thus, the stator 8 is completed. Prepreg sheets impregnated with an insulating resin may be used as the insulating members 18 inserted in the slots 37 and the wedges 38 instead of the insulating resin.

The multiple-phase windings 20 of this automotive alternator are formed by using the twelve continuous conductors 19 and hence work for inserting a plurality of short conductor segments in a stator core and connecting end parts by welding or the like is not necessary. Thus, the stator can be very efficiently manufactured. Since the flat winding set 28 is rolled in a cylinder and the rolled winding set 28 is inserted in the annular stator core 16, the efficiency of assembling work for assembling the stator is very high as compared with prior art assembling work that inserts a plurality of conductor segments one by one in slots. Since bent parts 39 of the conductors 19 form the coil ends, joints in the coil end parts appear only at joints of the respective ends of the leading and the trailing end of the winding set 28 and joints of connecting wires. Thus, the stator 8 has a very small number of joints. Consequently, the breakage of the insulating films that is caused by forming the joints and the resultant short-circuit failures can be controlled, and hence the stator is excellently insulated.

Since the stator core 16 is a unitary annular member, is not formed by rolling a flat member and does not have any butt joint, magnetic noise can be reduced, and faulty insulation attributable to butt welding can be prevented.

Since the conductors 19 have a rectangular cross section, the sectional shape of the straight parts fitted in the slots 37 conforms to the shape of the slot 37. Thus, the conductors 19 can be satisfactorily fitted in the slots 37 in a high space factor, and heat can be efficiently transferred from the conductors 19 to the stator core 16.

Second Embodiment

Figure 11:
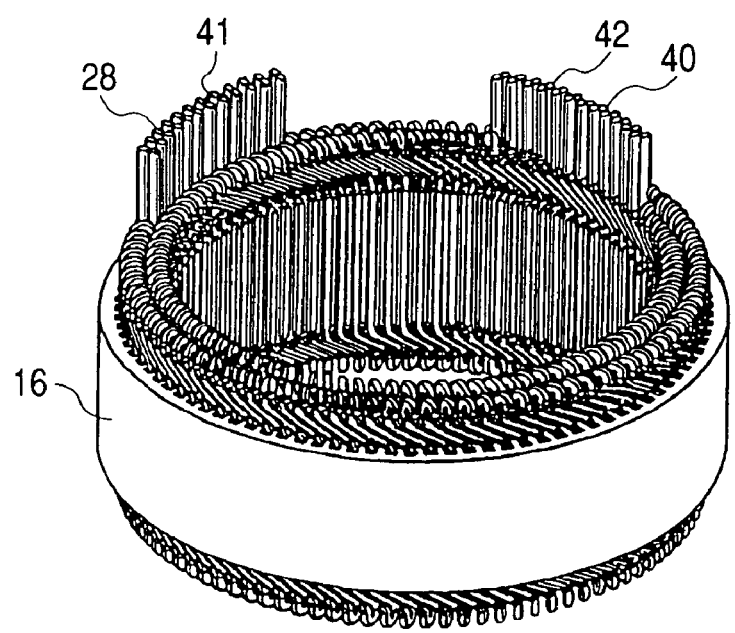
FIG. 11 is a perspective view of a stator included in a second embodiment according to the present invention.

FIG. 11 shows a second embodiment of the present invention. A first winding set 28 and a second winding set 40 are mounted in that order on a stator core 16 by the same procedure as that employed in the first embodiment. The ends 42 of the conductors forming the second winding set 40 are spaced a predetermined number of slots (e.g., 12×n slots) from the ends 41 of the conductors forming the first winding set 28 on the stator core 16. Thus, the number of the conductors of the second embodiment is twice that of the conductors of the first embodiment, and hence the output of the second embodiment is higher than that of the first embodiment. Since the ends of the conductors of the first winding set are spaced a predetermined number of slots (e.g., 12×n slots) from the ends of the first winding set, the possibility of short circuit that occurs in connecting the ends of the conductors and the connecting wires can be reduced. Since the same assembling jigs are used for mounting both the first winding set 28 and the second winding set 40 on the stator core 16, the cost of jigs can be reduced.

The alternator according to the embodiments of the present invention has the multiple-phase stator windings formed by winding the continuous conductors, and the method of fabricating the alternator according to the present invention forms the multiple-phase stator windings by winding the continuous conductors. Therefore, a process needed by the prior art stator for inserting a plurality of conductor segments in slots formed in a stator core, and a process for connecting the ends of the conductor segments are unnecessary. Thus, the stator of the electric rotating machine according to the present invention facilitates assembling work. The remarkable reduction of joints reduces short-circuit failures attributable to the formation of joints, and improves quality. Since the stator core is a unitary annular member, the increase of magnetic noise and faulty insulation attributable to rolling a flat member and butt welding opposite sides of the rolled flat member can be prevented.

According to the alternator and the method of fabricating the same of the embodiments of the present invention, output can be increased because an increased number of conductors can be embedded in each of the slots of the stator core. Since the ends of the conductors are distributed, the possibility of short-circuit failures attributable to work for connecting the ends of the conductors and the connecting wires can be reduced.

According to the alternator and the method of fabricating the same of the embodiments of the present invention, the conductors can be efficiently fitted in the slots, and damaging the insulation of the conductors by the edges of the slots can be prevented.

According to the alternator and the method of fabricating the same of the embodiments of the present invention, magnetic circuit loss attributable to open slots can be controlled.

What is claimed is:

1. A method of fabricating an electric rotating machine including a rotor having a plurality of N and S poles alternately arranged in a rotating direction, a stator including an annular stator core surrounding the rotor and provided with a plurality of slots, and a multiple-phase stator windings embedded in the slots, and a frame supporting the rotor and the stator, said method comprising;

forming the stator windings by winding a plurality of continuous wires around a spool;

press-forming flat straight parts of the stator windings to be embedded in the slots of the stator core;

winding a stator winding set in the annular shape around a cylindrical member provided with grooves the number of which is equal to that of the slots of the stator core;

inserting the cylindrical member in a bore defined by the annular stator core;

adjusting the position of the cylindrical member in the bore of the annular stator core so that the grooves of the cylindrical member are positioned opposite to the slots of the stator core, respectively;

expanding and inserting the straight parts of the windings wound around the grooves in the slots of the stator core;

alternately folding back the winding set outside the slots of the stator core to form windings embedded alternately in the direction of the depth of the slots every predetermined number of slots; and winding leading and trailing ends of the plurality of continuous wires at least one turn around the circumferentially arranged slots of the stator core so that the leading and the trailing ends of the plurality continuous wires are superposed.

2. The method according to claim 1, wherein the stator windings are formed in at least two winding sets by winding a plurality of continuous wires, and the stator windings are arranged at intervals of a predetermined number of slots so that the trailing ends of the sets of windings may not be superposed with respect to a circumferential direction of the stator core.

3. The method according to claim 1, wherein the slots of the stator core are open slots.

4. The method according to claim 3, wherein the stator windings embedded in the slots of the stator core are fixed in place by inserting magnetic wedges in the slots.

* * * * *